(12) United States Patent
Mikami

(10) Patent No.: US 11,402,832 B2
(45) Date of Patent: Aug. 2, 2022

(54) DETERMINING DEVICE, DETERMINING METHOD, AND RECORDING MEDIUM HAVING DETERMINING PROGRAM RECORDED THEREON

(71) Applicant: NEC Platforms, Ltd., Kawasaki (JP)

(72) Inventor: Tomoko Mikami, Kawasaki (JP)

(73) Assignee: NEC Platforms, Ltd., Kanagawa (JP)

( * ) Notice: Subject to any disclaimer, the term of this patent is extended or adjusted under 35 U.S.C. 154(b) by 354 days.

(21) Appl. No.: 16/463,870

(22) PCT Filed: Dec. 8, 2017

(86) PCT No.: PCT/JP2017/044188
 § 371 (c)(1),
 (2) Date: May 24, 2019

(87) PCT Pub. No.: WO2018/110450
 PCT Pub. Date: Jun. 21, 2018

(65) Prior Publication Data
 US 2019/0294156 A1   Sep. 26, 2019

(30) Foreign Application Priority Data

Dec. 13, 2016 (JP) .............................. JP2016-240897

(51) Int. Cl.
 *G01D 21/00*   (2006.01)
 *G05B 23/02*   (2006.01)

(52) U.S. Cl.
 CPC ............. *G05B 23/02* (2013.01); *G01D 21/00* (2013.01)

(58) Field of Classification Search
 CPC .... G01D 21/00; G05B 23/02; G05B 23/0232; G05B 23/0235; G01F 1/8436; G01R 35/00; G01R 35/005
 (Continued)

(56) References Cited

U.S. PATENT DOCUMENTS 6,200,021 B1 * 3/2001 Mitsutani ................. F01P 11/16
 374/1
7,110,917 B2 * 9/2006 Matsuura .............. G06F 11/008
 358/1.14
(Continued)

FOREIGN PATENT DOCUMENTS

JP   H06-168394 A   6/1994
JP   2000-147049 A   5/2000
(Continued)

OTHER PUBLICATIONS

International Search Report for PCT Application No. PCT/JP2017/044188, dated Feb. 27, 2018.
(Continued)

*Primary Examiner* — Jeffrey P Aiello
(74) *Attorney, Agent, or Firm* — Sughrue Mion, PLLC

(57) ABSTRACT

The present invention addresses the problem of providing a determining device that can improve the precision of determination as to the presence or absence of an abnormality as indicated by an output value. In order to solve this problem, a determining device according to the present invention includes a deriving means, a determining means, and an output means. The deriving means derives a degree value from an output value output from a sensor, the degree value indicating a degree of temporal variation in the output value. The determining means derives a third determination result relating to a first output value, which is the abovementioned output value, from a first determination result and a second determination result. Here, the first determination result is a determination result about the magnitude of the first output value relating to a first time, associated with the time when the sensor outputted the first output value.

15 Claims, 10 Drawing Sheets

(58) Field of Classification Search
USPC .................................. 324/601; 702/104, 182
See application file for complete search history.

(56) References Cited

U.S. PATENT DOCUMENTS

| | | | | |
|---|---|---|---|---|
| 2005/0251315 A1* | 11/2005 | Tanaka | .................... | F16H 61/12 |
| | | | | 701/51 |
| 2008/0053240 A1* | 3/2008 | Henry | .................... | G01F 15/024 |
| | | | | 73/861.04 |
| 2012/0022711 A1* | 1/2012 | Sakaguchi | ........ | H02J 13/00006 |
| | | | | 700/295 |
| 2013/0328572 A1* | 12/2013 | Wang | .................... | A61B 5/7225 |
| | | | | 324/601 |
| 2021/0113119 A1* | 4/2021 | Yang | .................... | A61B 5/1473 |

FOREIGN PATENT DOCUMENTS

| | | | |
|---|---|---|---|
| JP | 2005308104 A | * | 11/2005 |
| JP | 2005308104 A | | 11/2005 |
| JP | 2007-131017 A | | 5/2007 |
| JP | 2007131017 A | * | 5/2007 |
| JP | 2007170242 A | | 7/2007 |
| JP | 2007-327885 A | | 12/2007 |
| JP | 2012-014222 A | | 1/2012 |
| JP | 2015036066 A | | 2/2015 |
| JP | 2016161478 A | | 9/2016 |
| WO | 2011/070762 A1 | | 6/2011 |

OTHER PUBLICATIONS

English translation of Written opinion for PCT Application No. PCT/JP2017/044188.
Japanese Office Action for JP Application No. 2016-240897 dated Sep. 1, 2020 with English Translation.
Japanese Office Action for JP Application No. 2016-240897 dated Mar. 23, 2021 with English Translation.

* cited by examiner

DETERMINING DEVICE, DETERMINING METHOD, AND RECORDING MEDIUM HAVING DETERMINING PROGRAM RECORDED THEREON

This application is a National Stage Entry of PCT/JP2017/044188 filed on Dec. 8, 2017, which claims priority from Japanese Patent Application 2016-240897 filed on Dec. 13, 2016, the contents of all of which are incorporated herein by reference, in their entirety.

TECHNICAL FIELD

The present invention relates to a determining device that determines an output value.

BACKGROUND ART

When it is determined whether a predetermined state represented by an output value from a sensor or the like is abnormal, an erroneous determination result may sometimes be derived due to an influence of noise.

In order to solve this problem, for example, PTL 1 discloses a method of determining occurrence of a breaker failure when, after detection of single occurrence of a vibration, occurrence of another vibration is detected again subsequently within a predetermined time.

CITATION LIST

Patent Literature

[PTL 1] Japanese Unexamined Patent Application Publication No. 2000-147049

SUMMARY OF INVENTION

Technical Problem

However, noise may occur a plurality of times within a predetermined time. In such a case, the method disclosed in PTL 1 erroneously determines occurrence of a failure on the basis of the noise that occurs a plurality of times.

An object of the present invention is to provide a determining device which is capable of improving precision of determination as to presence or absence of an abnormality represented by a predetermined output value.

Solution to Problem

A determining device of the present invention includes: a deriving unit that derives, from a predetermined output value, a degree value representing a degree of a time change of the output value; a determining unit that derives a third determination result regarding a first output value being the output value from a first determination result regarding a magnitude of the first output value relating to a first time associated with a time when the first output value is output, and a second determination result regarding a magnitude of a first degree value being the degree value which the deriving unit derives from the output value relating to each of a plurality of times including the first time; and an output unit that outputs the third determination result.

Advantageous Effects of Invention

The determining device and the like according to the present invention are capable of improving precision of determination as to presence or absence of an abnormality represented by a predetermined output value.

EXAMPLE EMBODIMENT

[Configuration and Operation]

Figure 1:
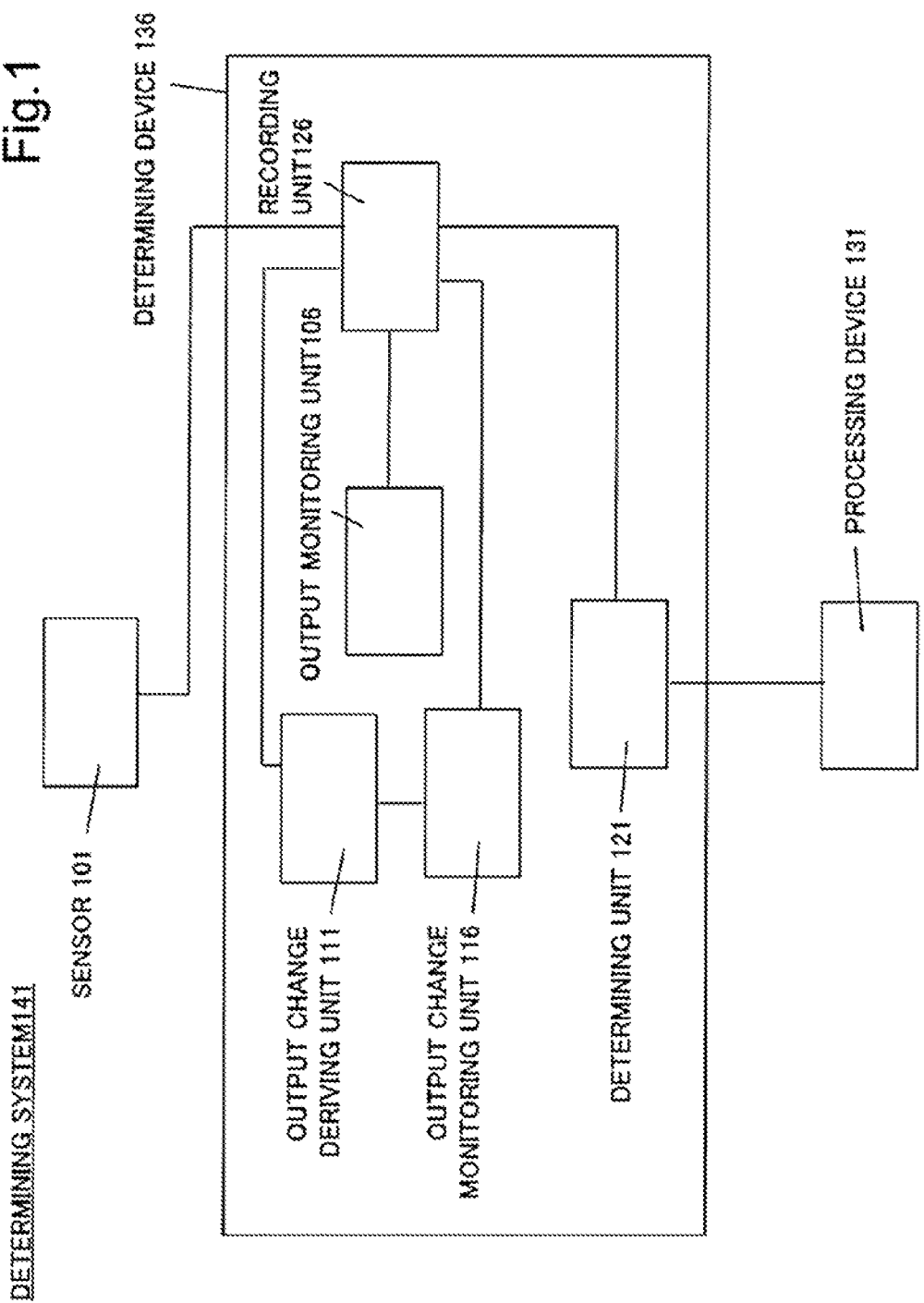
FIG. 1 is a conceptual diagram illustrating a configuration example of a determining system of this example embodiment.

FIG. 1 is a conceptual diagram illustrating a configuration of a determining system 141 as an example of a determining system of the example embodiment.

The determining system 141 includes a sensor 101, a determining device 136, and a processing device 131.

The sensor 101 measures a predetermined degree of a detection target, and performs an output corresponding to the degree to the determining device 136. The sensor 101 is, for example, a thermometer, a hygrometer, an ammeter, a voltmeter, a wattmeter, a pressure gauge, an illuminometer, a displacement gauge, a speedometer, an accelerometer, or a concentration measurement meter. When the sensor 101 is of the above-described example, the above-described detection target is a temperature, a humidity, a current, a voltage, an electric power, a pressure, an illumination intensity, a displacement, a speed, an acceleration, or a concentration.

For example, the sensor 101 is a sensor that performs a digital output. In that case, the sensor 101 successively converts the degree of the detection target into a voltage, and outputs, to the determining device 136, digital output information in which the converted voltage (output) and a discontinuous time when the degree is detected are associated with each other.

When the sensor 101 is a sensor that performs an analog output, an analog/digital converter (not illustrated) is used, which converts an analog output from the sensor 101 into the above-mentioned output information and outputs the output information to the determining device 136.

A description will be made below of the case where the output from the sensor 101 to the determining device 136 is the above-mentioned output information.

The determining device 136 is a device for determining whether the output from the sensor 101 represents an abnormality of the detection target of the sensor 101.

The determining device 136 includes an output change deriving unit 111, an output change monitoring unit 116, an output monitoring unit 106, a determining unit 121, and a recording unit 126.

The above-mentioned output information is successively sent from the sensor 101 to the recording unit 126.

The recording unit 126 successively holds the output information sent from the sensor 101. The recording unit 126 also holds a threshold value to be described later, which is used in processing performed in the output monitoring unit 106 and the output change monitoring unit 116. The recording unit 126 further holds information indicated by each component of the determining device 136. The recording unit 126 also sends, to each component of the determining device 136, the information indicated by each component.

At predetermined timing, the output monitoring unit 106 reads the above-mentioned output information held by the recording unit 126. The output information read by the output monitoring unit 106 is the latest one recorded by the recording unit 126 or a last one though not the latest. Then, the output monitoring unit 106 compares an output value included in the output information and a threshold value Th1 read from the recording unit 126 with each other in terms of a magnitude. Then, the output monitoring unit 106 records, in the recording unit 126, information (first flag information) obtained by combining information (a first flag) in which a result of the comparison represents the presence or absence of a possibility of an abnormality (an output abnormality) of the output value and a time included in the output information with each other. The first flag is, for example, either 0 or 1. Then, for example, the first flag suggests the possibility of the output abnormality in the case of being 1, and does not suggest the possibility of the output abnormality in the case of being 0. When the first flag suggests the possibility of the output abnormality, the output value can be larger or smaller than the threshold value Th1.

At predetermined timing, the output change deriving unit 111 reads the above-mentioned output information from the recording unit 126. The output information read by the output change deriving unit 111 is the latest one recorded by the recording unit 126 or a last one though not the latest. Then, the output change deriving unit 111 derives a value (an output change value), which represents a time change of the output value, at the time included in the read output information or at a time close to the time.

For example, the output change value is a change value of an output value at the time from an output value at a time before a predetermined time. Alternatively, the output change value is, for example, an inclination at a time in a curve representing a relationship between an output value and the time. An example of a method of deriving the output change value will be described later in a section of a processing flow.

The output change deriving unit 111 sends information (output change information), which is obtained by combining the derived output change value and the above-described time with each other, to the output change monitoring unit 116.

Every time when the output change information is sent from the output change deriving unit 111, the output change monitoring unit 116 compares the output change value included in the output change information and a threshold value Th2 read from the recording unit with each other in terms of a magnitude. The threshold value Th2 is a threshold value for the output change value, which is predetermined for the comparison processing. Then, the output change monitoring unit 116 records, in the recording unit 126, information (second flag information) obtained by combining information (a second flag) representing a possibility of the presence or absence of an abnormality of the output change value on the basis of a result of the comparison and a time included in the above-described output information with each other. The second flag is, for example, either 0 or 1. Then, for example, the first flag suggests the possibility of the output abnormality in the case of being 1, and does not suggest the possibility of the output abnormality in the case of being 0. When the second flag suggests the possibility of the output abnormality, the output change value can be larger or smaller than the threshold value Th2.

Sequentially in time series, the determining unit 121 reads the above-mentioned first flag information, and the above-mentioned second flag information including the same time as the time included in the first flag information, both information being recorded in the recording unit 126. Then, when each of the read first and second flags including the read same time represents that there is a possibility of abnormality, the determining unit 121 determines whether each of the first and second flags regarding a time elapsed from the time concerned by a predetermined time represents that there is a possibility of abnormality. Then, in the case of determining that each of the first and second flags suggests the possibility of abnormality, the determining unit 121 outputs information, which represents that there is an abnormality, to the processing device 131.

In the case of receiving the information, which represents that there is an abnormality, from the determining device 136, the processing device 131 performs predetermined processing. For example, the processing is output of the information representing that there is an abnormality, shutdown of a power supply of a device or the like as a monitoring target relating to the detection target by the sensor 101, and the like.

[Processing Flow]

As a premise of the following description, the sensor 101 illustrated in FIG. 1 sequentially sends output information, which is obtained by associating the output value corresponding to the degree of the detection of the detection target and the time of the detection with each other, to the recording unit 126. Then, the recording unit 126 sequentially records and holds the output information sent from the sensor 101.

Figure 2:
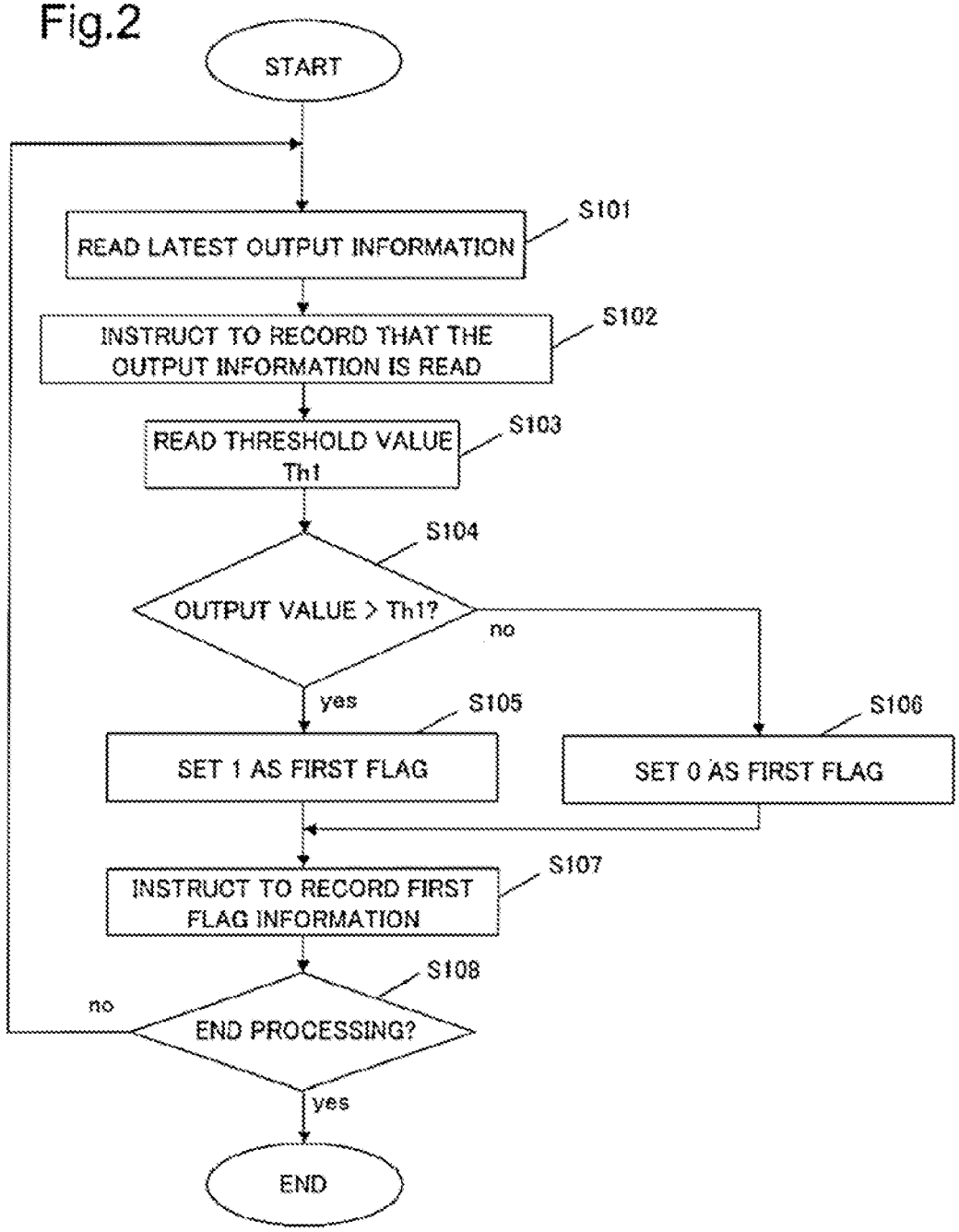
FIG. 2 is a conceptual diagram illustrating a processing flow example of processing performed by an output monitoring unit.

FIG. 2 is a conceptual diagram illustrating a processing flow example of the processing performed by the output monitoring unit 106 illustrated in FIG. 1.

First, as processing of S101, the output monitoring unit 106 reads the latest output information, which is held by the recording unit 126, from the recording unit 126.

Then, as processing of S102, the output monitoring unit 106 instructs the recording unit 126 to record that the output monitoring unit 106 has read such recorded information read by the processing of S101. Upon receiving the instruction, the recording unit 126 performs the recording.

Then, as processing of S103, the output monitoring unit 106 reads the threshold value Th1 from the recording unit 126. The threshold value Th1 is a threshold value for the above-mentioned output value, which is predetermined for the processing of S103. A value of the threshold value Th1 shall be adjusted and set before the start of operation of the determining system 141 by verifying the validity of the output result from the determining unit 121 illustrated in FIG. 1.

Then, as processing of S104, the output monitoring unit 106 determines whether the output value included in the output information read by the processing of S101 is larger than the threshold value Th1.

When a determination result by the processing of S104 is yes, the output monitoring unit 106 performs processing of S105.

Meanwhile, when the determination result by the processing of S104 is no, the output monitoring unit 106 performs processing of S106.

In the case of performing the processing of S105, the output monitoring unit 106 sets, as the processing, 1 as the above-mentioned first flag. Herein, that the first flag is 1 is premised to suggest the possibility of output abnormality.

Then, the output monitoring unit 106 performs processing of S107.

Meanwhile, in the case of performing the processing of S106, the output monitoring unit 106 sets, as the processing, 0 as the above-mentioned first flag. Herein, that the first flag is 0 is premised not to suggest the possibility of output abnormality.

Then, the output monitoring unit 106 performs the processing of S107.

In the case of performing processing of S107, the output monitoring unit 106 generates, as the processing, first flag information obtained by combining the set first flag and the time of the output information read in S101 with each other. Then, the output monitoring unit 106 sends the first flag information to the recording unit 126, and instructs the recording unit 126 to record the first flag information.

Then, as processing of S108, the output monitoring unit 106 determines whether to end the processing illustrated in FIG. 2. The output monitoring unit 106 performs the determination, for example, by determining whether end information is input from the outside.

When a determination result by the processing of S108 is yes, the output monitoring unit 106 ends the processing illustrated in FIG. 2.

Meanwhile, when the determination result by the processing of S108 is no, the output monitoring unit 106 performs the processing of S101 again.

Figure 3:
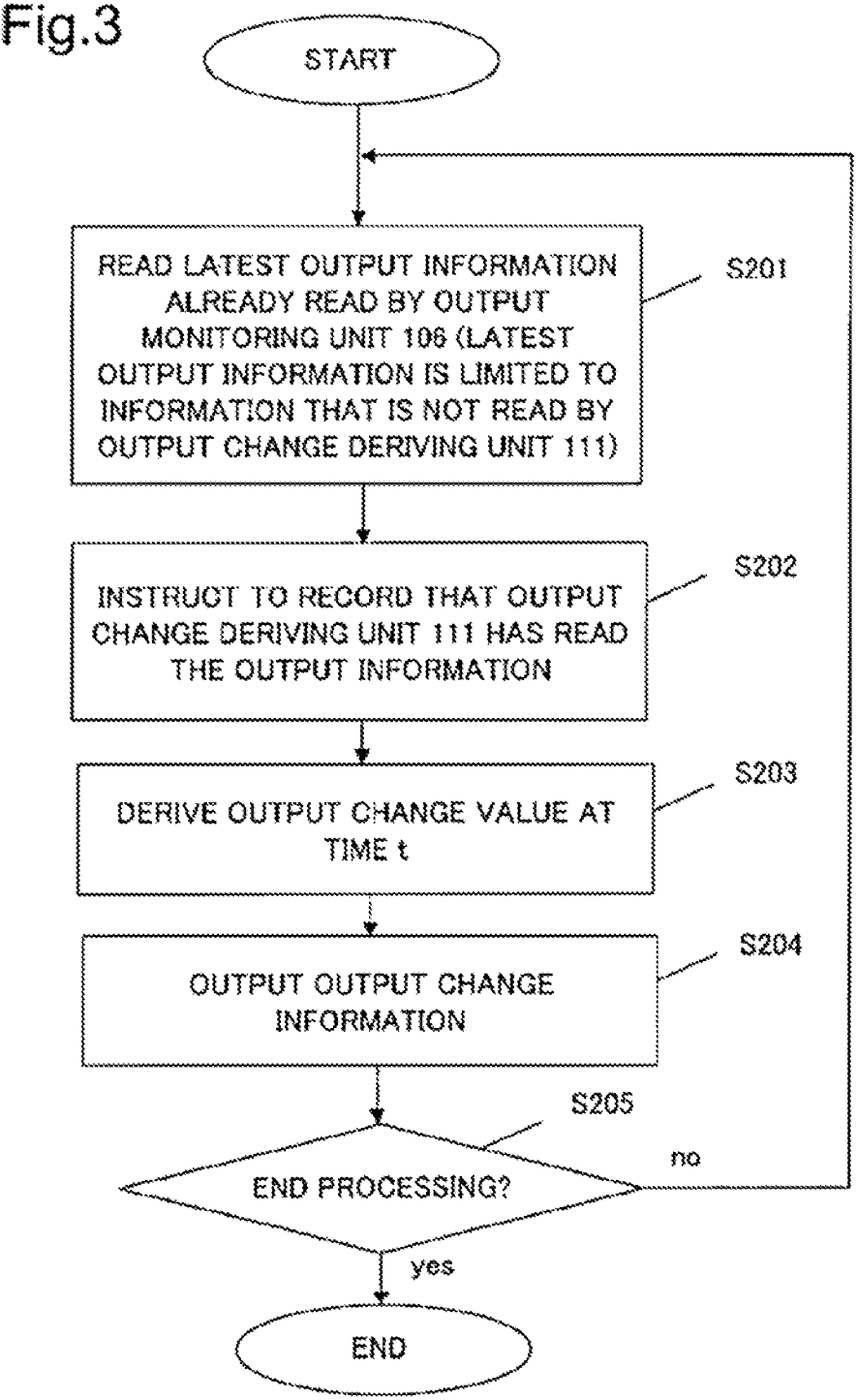
FIG. 3 is a conceptual diagram illustrating a processing flow example of processing performed by an output change deriving unit.

FIG. 3 is a conceptual diagram illustrating a processing flow example of the processing performed by the output change deriving unit 111 illustrated in FIG. 1.

First, as processing of S201, the output change deriving unit 111 reads, from the recording unit 126, the latest output information from among those already read from the recording unit 126 by the output monitoring unit 106. As mentioned above, by the processing of S102 illustrated in FIG. 2, the recording unit 126 holds the information as to whether the output monitoring unit 106 has already read the held output information. Therefore, the output change deriving unit 111 can read only the output information, which is already read from the recording unit 126 by the output monitoring unit 106.

Moreover, it is defined that the output information which the output change deriving unit 111 reads from the recording unit 126 by the processing of S201 is limited to that which the output change deriving unit 111 has not yet read from the recording unit 126. As will be described next, by processing of S202, the recording unit 126 holds information as to whether the output change deriving unit 111 has already read the held output information. Therefore, the output change deriving unit 111 can read only such output information which the output change deriving unit 111 has not yet read from the recording unit 126.

Next, the output change deriving unit 111 instructs the recording unit 126 to record information to the effect that the output change deriving unit 111 has already read the output information read by the processing of S201. Upon receiving the instruction, the recording unit 126 records the information.

Then, as processing of S203, the output change deriving unit 111 derives an output change value at time t, which is included in the output information read by the processing of S201. Detailed examples of the processing of S203 will be described later with reference to FIG. 4 and FIG. 5.

Then, as processing of S204, the output change deriving unit 111 outputs output change information, which is obtained by combining the output change value derived by the processing of S204 and the time t with each other, to the output change monitoring unit 116 illustrated in FIG. 1.

Then, as processing of S205, the output change deriving unit 111 determines whether to end the processing illustrated in FIG. 3. The output change deriving unit 111 performs the determination, for example, by determining whether output information is input from the outside.

When a determination result by the processing of S205 is yes, the output change deriving unit 111 ends the processing illustrated in FIG. 3.

Meanwhile, when the determination result by the processing of S205 is no, the output change deriving unit 111 performs the processing of S201 again.

Figure 4:
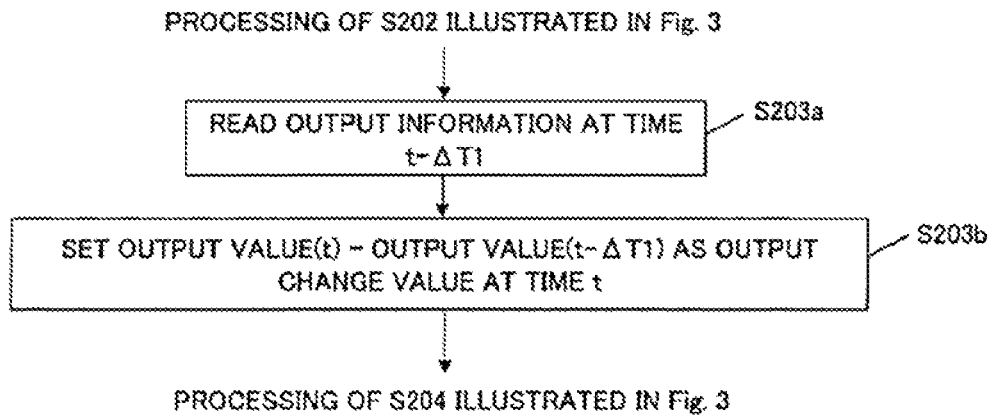
FIG. 4 is a conceptual diagram illustrating a first detailed example of processing of S203.

FIG. 4 is a conceptual diagram illustrating a first detailed example of the processing of S203 illustrated in FIG. 3.

Subsequently to the processing of S202 illustrated in FIG. 3, the output change deriving unit 111 reads output information including a time t−ΔT1 from the recording unit 126, as processing of S203a. Herein, the time t is a time included in the output information read by the processing of S201 illustrated in FIG. 3. Moreover, ΔT1 is a time which is preset for processing of S203b. A value of ΔT1 shall be adjusted and set before the start of operation of the determining system 141 by separately verifying the validity of the output result from the determining unit 121 illustrated in FIG. 1. When the recording unit 126 does not hold the output information including the time t−ΔT1, the output change deriving unit 111 reads, for example, output information including a time closest to the time t−ΔT1.

Next, the output change deriving unit 111 sets a value, which is obtained by subtracting the output value at the time t−ΔT1 (or the time closest to the time t−ΔT1) from the output value at the time t, as the output change value at the time t (S203b).

Then, the output change deriving unit 111 performs processing of S204 illustrated in FIG. 3.

Figure 5:
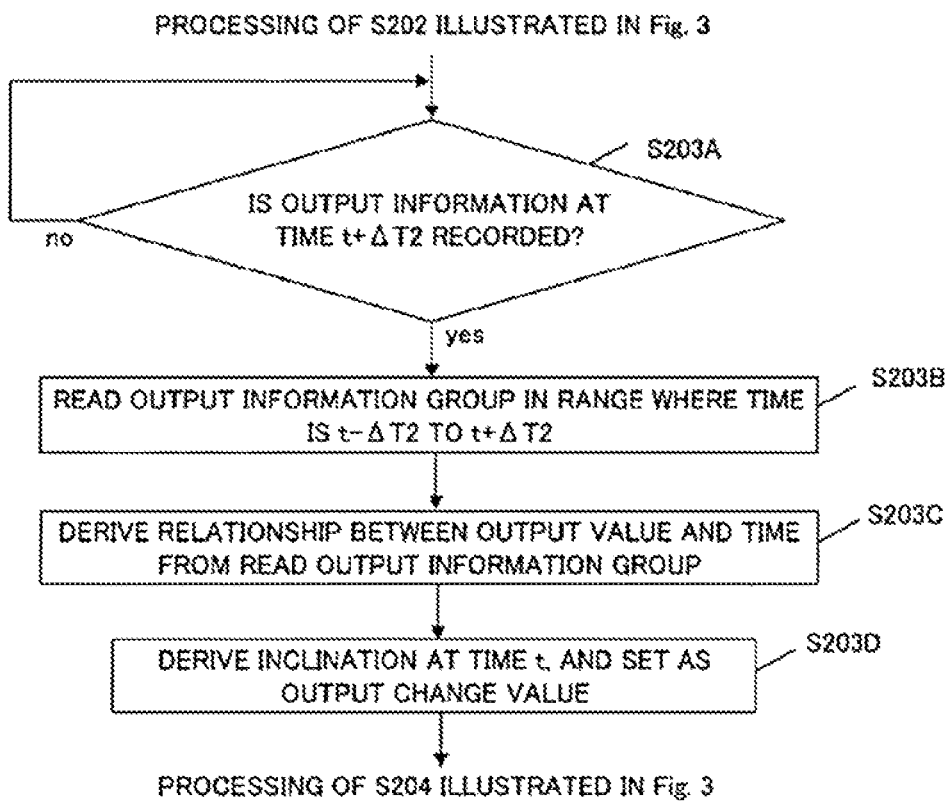
FIG. 5 is a conceptual diagram illustrating a second detailed example of processing of S203.

FIG. 5 is a conceptual diagram illustrating a second detailed example of the processing of S203 illustrated in FIG. 3.

Subsequently to the processing of S202 illustrated in FIG. 3, the output change deriving unit 111 determines whether output information including a time t+ΔT2 is recorded in the recording unit 126, as processing of S203A. Herein, the time t is a time included in the output information read by the processing of S201 illustrated in FIG. 3. Moreover, ΔT2 is a time which is preset for processing of S203A and 5203B that will be described next. A value of ΔT2 shall be adjusted and set before the start of operation of the determining system 141 by separately verifying the validity of the output result from the determining unit 121 illustrated in FIG. 1.

Next, as processing of S203B, the output change deriving unit 111 reads an output information group including a time included in a range from a time t−ΔT2 to the time t+ΔT2.

Then, as processing of S203C, the output change deriving unit 111 derives a relationship between the output value and the time on the basis of the output information group read by the processing of S203B.

Then, as processing of S203D, the output change deriving unit 111 derives an inclination at the time t in the relationship derived by the processing of S203C, and sets this inclination as the output change value. For example, the inclination is derived by deriving a differentiable function approximate to the output information group and obtaining an inclination (a differential value) at the time t in the function. The derivation can be performed by commercially available spreadsheet software or the like.

Then, the output change deriving unit 111 performs the processing of S204 illustrated in FIG. 3.

Figure 6:
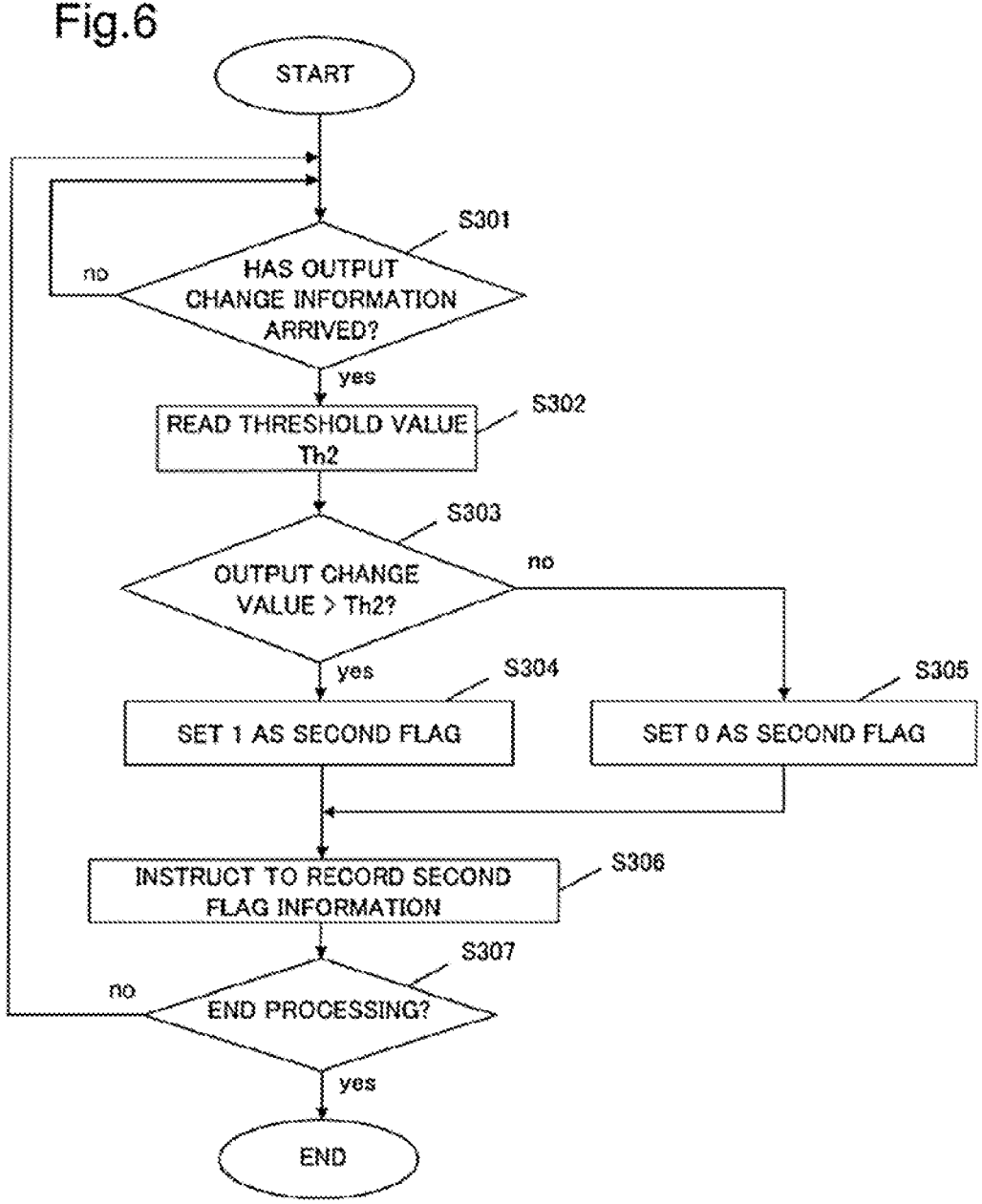
FIG. 6 is a conceptual diagram illustrating a processing flow example of processing performed by an output change monitoring unit.

FIG. 6 is a conceptual diagram illustrating a processing flow example of the processing performed by the output change monitoring unit 116 illustrated in FIG. 1.

First, as processing of S301, the output change monitoring unit 116 determines whether the output change information has arrived from the output change deriving unit 111.

When a determination result by the processing of S301 is yes, the output change monitoring unit 116 performs processing of S302.

Meanwhile, when the determination result by the processing of S301 is no, the output change monitoring unit 116 performs the processing of S301 again.

In the case of performing the processing of S302, the output change monitoring unit 116 reads, as the processing, the threshold value Th2 from the recording unit 126. The threshold value Th2 is a threshold value for the output change value, which is predetermined for processing of S303 that will be described next. A value of the threshold value Th2 shall be adjusted and set before the start of operation of the determining system 141 by verifying the validity of the output result from the determining unit 121 illustrated in FIG. 1.

Then, as the processing of S303, the output change monitoring unit 116 determines whether the output change value included in the output change information determined to have arrived by the processing of S301 is larger than the threshold value Th2 read by the processing of S302.

When a determination result by the processing of S303 is yes, the output change monitoring unit 116 performs processing of S304.

Meanwhile, when the determination result by the processing of S303 is no, the output change monitoring unit 116 performs processing of S305.

In the case of performing the processing of S304, the output change monitoring unit 116 sets, as the processing, 1 as the above-mentioned second flag. Herein, that the second flag is 1 is premised to suggest the possibility of output abnormality.

Then, the output change monitoring unit 116 performs processing of S306.

Meanwhile, in the case of performing the processing of S305, the output change monitoring unit 116 sets, as the processing, 0 as the above-mentioned second flag. Herein, that the second flag is 0 is premised not to suggest the possibility of output abnormality.

Then, the output change monitoring unit 116 performs the processing of S306.

In the case of performing the processing of S306, the output change monitoring unit 116 generates, as the processing, second flag information obtained by combining the set second flag and the time of the output information read by the processing of S301 with each other. Then, the output change monitoring unit 116 sends the first flag information to the recording unit 126, and instructs the recording unit 126 to record the first flag information.

Then, as processing of S307, the output change monitoring unit 116 determines whether to end the processing illustrated in FIG. 6. The output change monitoring unit 116 performs the determination, for example, by determining whether end information is input from the outside.

When a determination result by the processing of S307 is yes, the output change monitoring unit 116 ends the processing illustrated in FIG. 6.

Meanwhile, when the determination result by the processing of S307 is no, the output change monitoring unit 116 performs the processing of S301 again.

Figure 7:
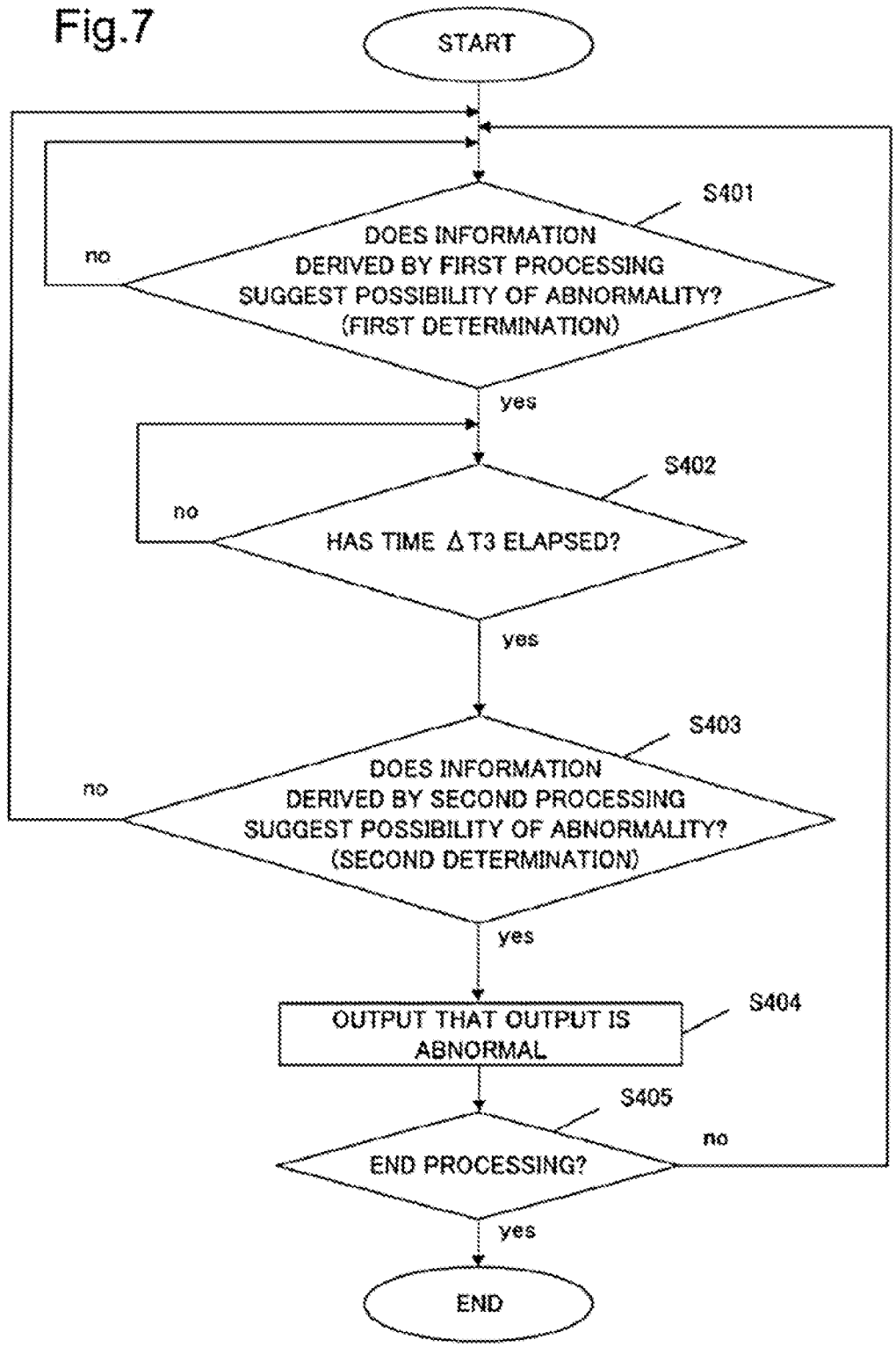
FIG. 7 is a conceptual diagram illustrating a processing flow example of processing performed by a determining unit.

FIG. 7 is a conceptual diagram illustrating a processing flow example of processing performed by the determining unit 121 illustrated in FIG. 1.

First, the determining unit 121 performs first processing as processing of S401, and performs a first determination as a determination as to whether information derived by the processing suggests an abnormality. Detailed examples of the first processing and the first determination will be described later with reference to FIG. 8.

When a determination result by the processing of S401 is yes, the determining unit 121 performs processing of S402.

Meanwhile, when the determination result by the processing of S401 is no, the determining unit 121 performs the processing of S401 again.

In the case of performing the processing of S402 the determining unit 121 determines, as the processing, whether a predetermined time ΔT3 has elapsed. The processing of S402 is processing performed for performing processing of S403, which is described later, after the predetermined time has elapsed. The time ΔT3 is a time which is preset for the processing of S402. The time ΔT3 shall be adjusted and set before the start of operation of the determining system 141 by verifying the validity of the output result from the determining unit 121 illustrated in FIG. 1.

When a determination result by the processing of S402 is yes, the determining unit 121 performs the processing of S403.

Meanwhile, when the determination result by the processing of S402 is no, the determining unit 121 performs the processing of S402 again.

In the case of performing the processing of S403, the determining unit 121 performs second processing as the processing, and performs a second determination as a determination as to whether information derived by the second processing suggests an abnormality. Detailed examples of the second processing and the second determination are, for example, similar to the first processing and the first determination, which are mentioned above. However, both cases can be assumed where the processing of S401 and the processing of S403 have the same contents and different contents.

When a determination result by the processing of S403 is yes, the determining unit 121 performs processing of S404.

Meanwhile, when the determination result by the processing of S403 is no, the determining unit 121 performs the above-mentioned processing of S401 again.

In the case of performing the processing of S404, the determining unit 121 outputs, as the processing, information representing that the output is abnormal to the processing device 131 illustrated in FIG. 1.

Then, as processing of S405, the determining unit 121 determines whether to end the processing illustrated in FIG. 7. The determining unit 121 performs the determination, for example, by determining whether end information is input from the outside.

When a determination result by the processing of S405 is yes, the determining unit 121 ends the processing illustrated in FIG. 7.

Meanwhile, when the determination result by the processing of S405 is no, the determining unit 121 performs the processing of S401 again.

Figure 8:
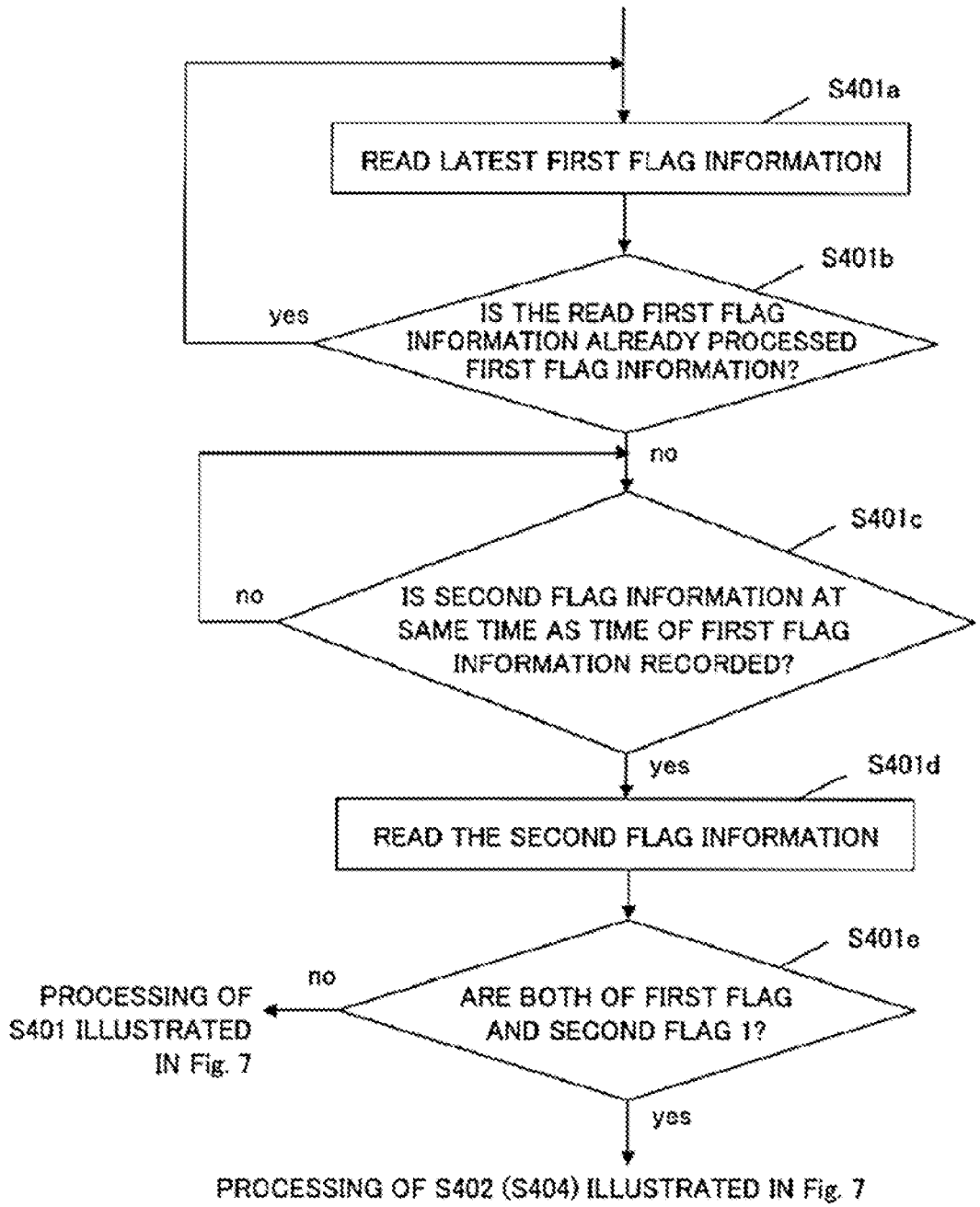
FIG. 8 is a conceptual diagram illustrating a detailed example of processing of S401 and S403.

FIG. 8 is a conceptual diagram illustrating a detailed example of the processing of S401 and S403 illustrated in FIG. 7.

When FIG. 8 is the detailed example of the processing of S401, the determining unit 121 performs processing of S401a subsequently to start illustrated in FIG. 7. Meanwhile, when FIG. 8 is the detailed example of the processing of S403, the determining unit 121 performs the processing of S401a subsequently to the processing of S402 illustrated in FIG. 7.

In the case of performing the processing of S401a, the determining unit 121 reads, as the processing, the latest first flag information from the recording unit 126.

Then, as processing of S401b, the determining unit 121 determines whether the first flag information read by the processing of S401a is first flag information for which the processing of S401a has already been performed.

When a determination result by the processing of S401b is yes, the determining unit 121 performs the processing of S401a again.

Meanwhile, when the determination result by the processing of S401b is no, the determining unit 121 performs the processing of S401c.

In the case of performing the processing of S401c, the determining unit 121 determines, as the processing, whether second flag information including the same time as the time included in the first flag information determined to be no by the processing of S401b is recorded in the recording unit 126. The determining unit 121 performs the determination, for example, by causing the recording unit 126 to determine whether the second flag information is recorded in the recording unit 126.

When a determination result by the processing of S401c is yes, the determining unit 121 performs the processing of S401d.

Meanwhile, when the determination result by the processing of S401c is no, the determining unit 121 performs the processing of S401c again.

In the case of performing the processing of S401d the determining unit 121 reads, as the processing, the second flag information, which is determined to be recorded in the recording unit 126 by the processing of S401c, from the recording unit 126.

Then, as processing of S401e, the determining unit 121 determines whether both of the first flag of the first flag information read by the processing of S401a and the second flag of the second flag information read by the processing of S401d are 1.

When a determination result by the processing of S401e is yes, in the case where FIG. 8 is the detailed example of the processing of S401 illustrated in FIG. 7, the determining unit 121 performs the processing of S402 illustrated in FIG. 7. Moreover, in the case where FIG. 8 is the detailed example of the processing of S403 illustrated in FIG. 7, the determining unit 121 performs the processing of S404 illustrated in FIG. 7.

Meanwhile, when the determination result by the processing of S401e is no, the determining unit 121 performs the processing of S401 illustrated in FIG. 7.

SPECIFIC EXAMPLE

Figure 9:
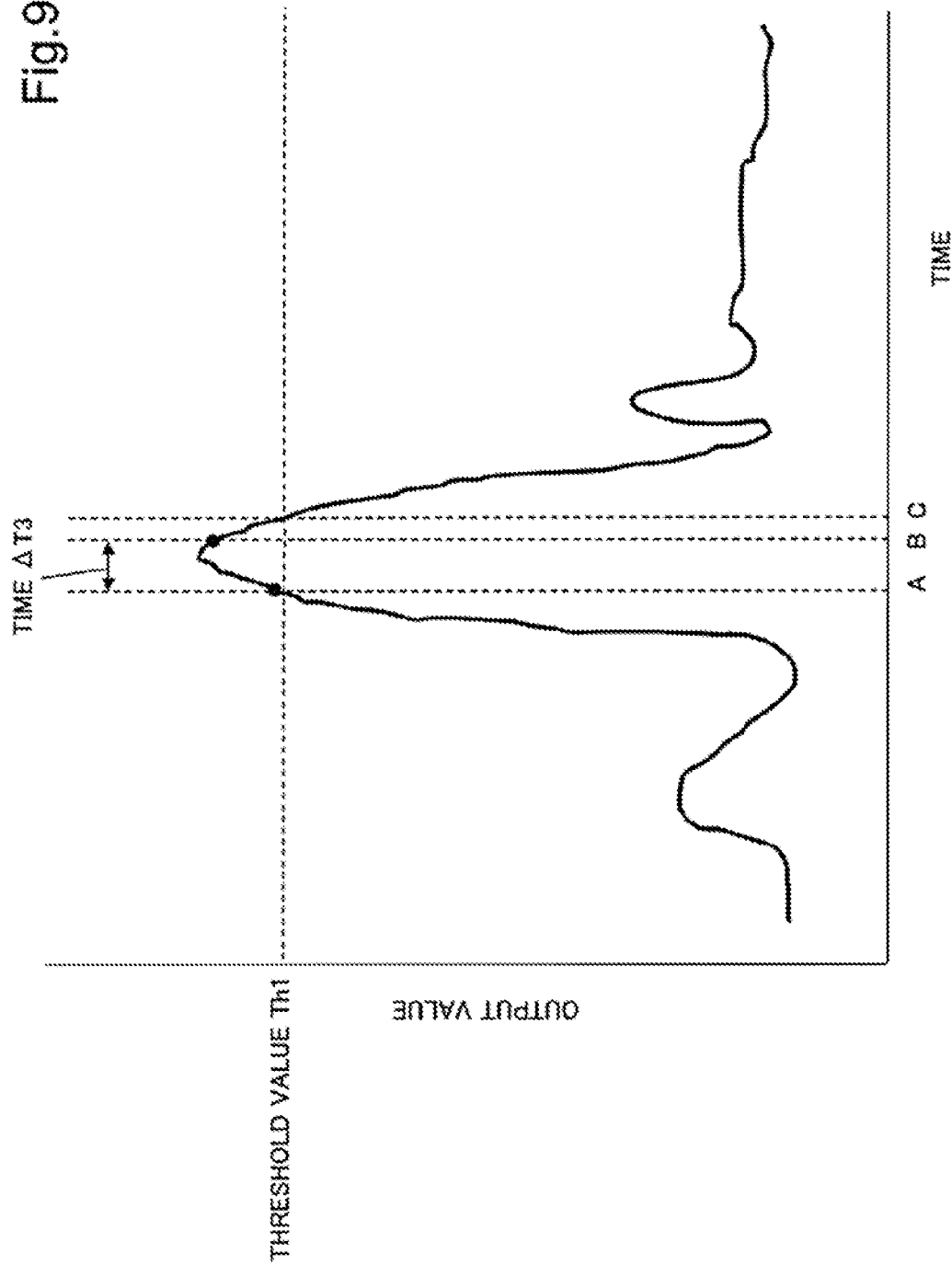
FIG. 9 is a diagram illustrating an example of a relationship between an output value and a time, in which the output value is not determined to represent an abnormality.

FIG. 9 is a diagram illustrating an example of a relationship between an output value and a time, from which an output abnormality is not determined by the determining device 136 illustrated in FIG. 1. Note that the time illustrated in FIG. 9 is a time detected for the detection target by the sensor 101 illustrated in FIG. 1. However, for example, when a central processing unit or the like of a computer is used as hardware that performs the processing, since a speed of the processing performed by the determining device 136 illustrated in FIG. 1 is sufficiently high, the time is assumed to be substantially equal to a processing time of each processing performed by the determining device 136.

The relationship between the output value and the time, which is illustrated in FIG. 9, is actually a set of discontinuous data. However, since mutually adjacent data are extremely close to one another, the data look continuous in FIG. 9. A threshold value Th1 illustrated in FIG. 9 is the threshold value Th1 mentioned at the time when the processing of S103 and S104 of FIG. 2 is described. Moreover, in the following description, it is assumed that the threshold value Th2 mentioned at the time when the processing of S302 and S303, which are illustrated in FIG. 6, is described is zero.

Now, a specific example of an operation is described when the determining device 136 illustrated in FIG. 1 sequentially performs the processing illustrated in FIG. 2 to FIG. 8 (excluding FIG. 4), as the time elapses.

Before a time A, the output value is smaller than the threshold value Th1. Therefore, the determination result by the processing of S104 illustrated in FIG. 2 becomes no. Then, the first flag becomes 0 by the processing of S106. Then, the determination result by the processing of S401e, which is illustrated in FIG. 8, in the processing of S401 illustrated in FIG. 7 becomes no. Hence, the determining device 136 does not perform the processing of S404 illustrated in FIG. 7. That is, the determining device 136 does not perform an output to the effect that the output is abnormal.

Shortly, the time A comes as the time elapses. At the time A, the output value is larger than the threshold value Th1. Therefore, the determination result by the processing of S104 illustrated in FIG. 2 becomes yes. Then, the determining device 136 sets the first flag to 1 by the processing of S105.

Moreover, an inclination (the output change value derived by the processing of FIG. 5) of a curve derived from the relationship illustrated in FIG. 9 at the time A is positive, and the output change value is larger than the threshold value Th2=0. Therefore, the determination result by the processing of S303 illustrated in FIG. 6 becomes yes, and 1 is set as the second flag by the processing of S304.

Therefore, the determination result of S401e illustrated in FIG. 8 in the processing of S401 of FIG. 7 becomes yes, and the determining device 136 performs the processing of S402 illustrated in FIG. 7.

Thereafter, the time ΔT3 elapses, and the determination result of the processing of S402 illustrated in FIG. 7 becomes yes. That is, a time B illustrated in FIG. 9 comes.

At the time B, the inclination (the output change value derived by the processing of FIG. 5) of the curve derived from the relationship illustrated in FIG. 9 is negative, and accordingly, the determination result by the processing of S303 illustrated in FIG. 6 becomes no, and the determining device 136 sets 0 as the second flag by the processing of S304.

Therefore, the determination result of S401e illustrated in FIG. 8 in the processing of S401 in FIG. 7 becomes no, and the determining device 136 does not perform the processing of S404 illustrated in FIG. 7. That is, the determining device 136 does not perform an output to the effect that the output is abnormal.

Thereafter, the inclination (the output change value) of the curve derived from the relationship illustrated in FIG. 9 is negative until a time C (and after also), and the output value becomes smaller than the threshold value Th1 after the time C. Therefore, the determination result of S401e, which is illustrated in FIG. 8, in the processing of S401 illustrated in FIG. 7 becomes no. Therefore, the determining device 136 does not perform the processing of S404 illustrated in FIG. 7. That is, the determining device 136 does not perform an output to the effect that the output is abnormal.

In such a manner as above, in the relationship between the output value and the time, which is illustrated in FIG. 9, the determining device 136 does not perform an output to the effect that the output is abnormal, at any time.

That is, in accordance with the determining device 136, the relationship between the output value and the time, which is illustrated in FIG. 9, is a mere noise, and does not exhibit an output abnormality.

Figure 10:
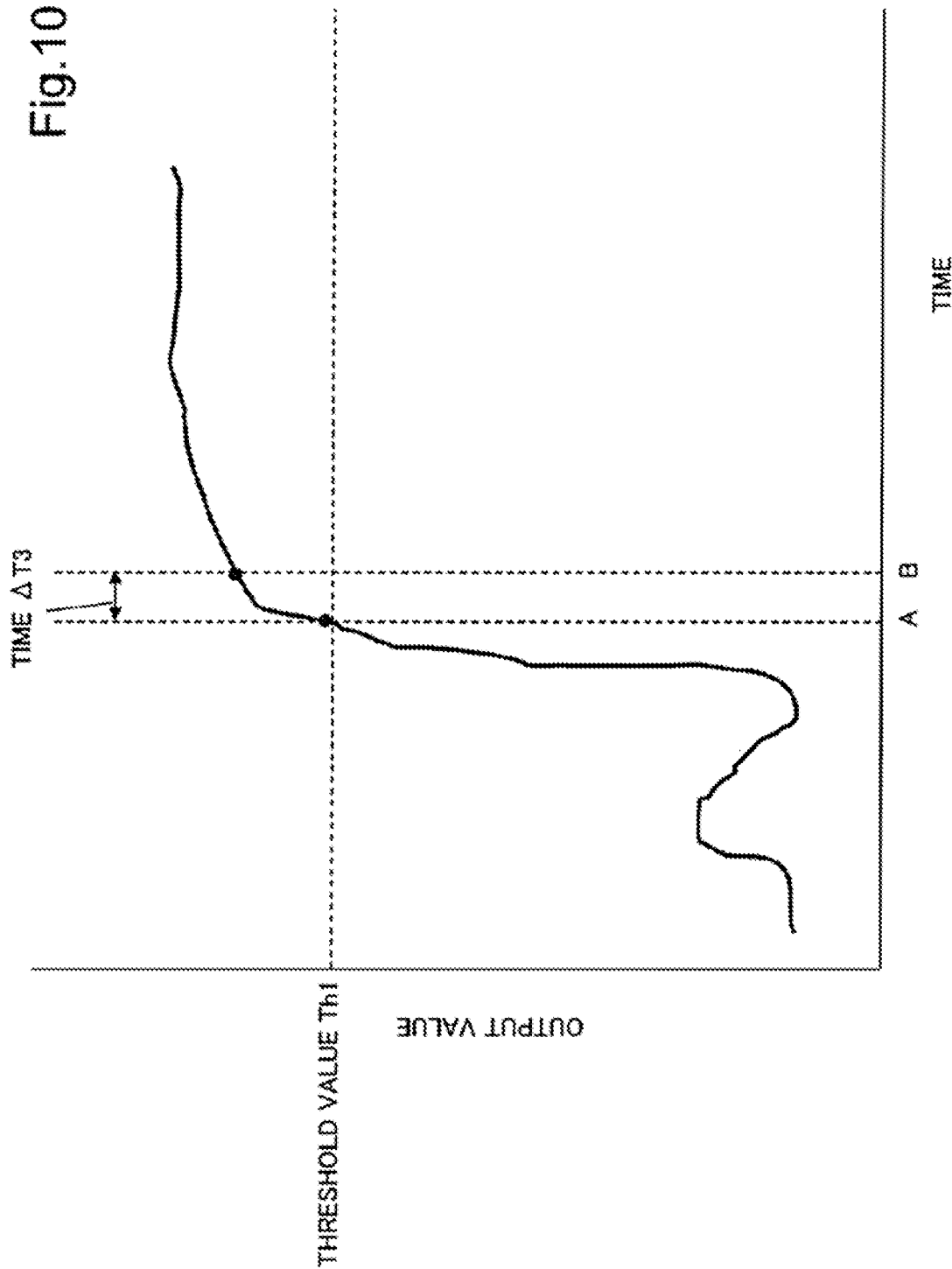
FIG. 10 is a diagram illustrating an example of a relationship between an output value and a time, in which the output value can be determined to represent an abnormality.

FIG. 10 is a diagram illustrating an example of a relationship between an output value from the sensor 101 and a time, in which the determining device 136 illustrated in FIG. 1 determines that the output value represents an abnormality. A description of the time, the relationship between the output value and the time, and the threshold values Th1 and Th2 is the same as that given with reference to FIG. 9.

Now, a specific example of an operation is described when the determining device 136 illustrated in FIG. 1 sequentially performs the processing illustrated in FIG. 2 to FIG. 5 and FIG. 7 and FIG. 8, as the time elapses.

First, before a time A, the output value is smaller than the threshold value Th1. Therefore, the determination result by the processing of S104 illustrated in FIG. 2 becomes no. Then, the first flag becomes 0 by the processing of S105. Therefore, the determination result by the processing of S401e, which is illustrated in FIG. 8, in the processing of S401 illustrated in FIG. 7 becomes no. Accordingly, the determining device 136 does not perform the processing of S404 illustrated in FIG. 7. That is, the determining device 136 does not perform an output to the effect that the output is abnormal.

Then, the time A comes as the time elapses. At the time A, the output value is larger than the threshold value Th1. Therefore, the determination result by the processing of S104 illustrated in FIG. 2 becomes yes. Then, the determining device 136 sets the first flag to 1 by the processing of S105.

Moreover, an inclination (the output change value derived by the processing of FIG. 5) of a curve derived from the relationship illustrated in FIG. 10 at the time A is positive, and the output change value is larger than the threshold value Th2=0. Therefore, the determination result by the processing of S303 illustrated in FIG. 6 becomes yes, and 1 is set as the second flag by the processing of S304.

Therefore, the determination result of S401e illustrated in FIG. 8 in the processing of S401 of FIG. 7 becomes yes, and the determining device 136 performs the processing of S402 illustrated in FIG. 7.

Thereafter, the time ΔT3 elapses, and the determination result of the processing of S402 illustrated in FIG. 7 becomes yes. That is, a time B illustrated in FIG. 10 comes.

At the time B, in addition to that the output value is larger than the threshold value Th1, the inclination (the output change value derived by the processing of FIG. 5) of the curve derived from the relationship illustrated in FIG. 10 is positive, and accordingly, the determination result by the processing of S303 illustrated in FIG. 6 becomes yes. Then, the determining device 136 sets 1 as the second flag by the processing of S304.

Therefore, the determination result of S401e illustrated in FIG. 8 in the processing of S401 in FIG. 7 becomes yes, and the determining device 136 performs the processing of S404 illustrated in FIG. 7. That is, the determining device 136 performs an output to the effect that the output is abnormal. Thereafter, until the inclination of the curve derived from the relationship illustrated in FIG. 10 becomes negative at a time relating to the determination, the determining device 136 repeats such an output to the effect that the output is abnormal, every time ΔT3.

That is, in accordance with the determining device 136, the relationship between the output value and the time, which is illustrated in FIG. 10, is not a mere noise, but exhibits an output abnormality.

Advantageous Effects

The determining device 136 performs the determination (the second determination) as to whether the output change value exceeds the second threshold value, in addition to the determination (the first determination) as to whether the output value from the sensor 101 exceeds the first threshold value.

The above-described first determination is likely to be affected by a noise. Therefore, when the presence or absence of the abnormality (the output abnormality) represented by the output value from the sensor is determined on the basis of only the determination result by the first determination, it is highly possible that an erroneous determination result may be derived from the influence of the noise.

In contrast, the determining device 136 determines the presence or absence of the output abnormality also in consideration of the determination result of the above-described second determination. The above-described second determination is a determination about the output change value as a value representing the degree of the time change of the output value. Therefore, it becomes possible to perform a determination considering a direction where the output value will change in future and a degree of the change. Since much of such noises as described above increases and decreases in a short time, many adverse effects of such noises as described above can be removed by the above-described second determination. That is, also in the above-described point alone, the determining device 136 is capable of improving determination accuracy for the presence or absence of the output abnormality.

In addition to the above, when both of the first and second determination results suggest the output abnormality, the determining device 136 performs determinations again (re-determination) similar to the above-described first and second determinations after the elapse of a predetermined time. Then, when determination results by the re-determination do not become similar to the previous determination results, a determination result to the effect that the output value from the sensor does not exhibit an abnormality is derived on the basis of the understanding that both of the above-described first and second determination results are affected by noises.

As mentioned above, the noise increases and decreases in a short time in many cases. Therefore, when both of the first and second determination results suggest the output abnormality due to the influence of the noise, determination results after the elapse of a predetermined time, which correspond to the above-described first and second determination results, change in many cases. Hence, by the above-described re-determination, the determining device 136 is capable of further reducing the influence of the noise to the output abnormality.

From the above, the determining device 136 is capable of improving the determination accuracy for the output abnormality.

Figure 11:
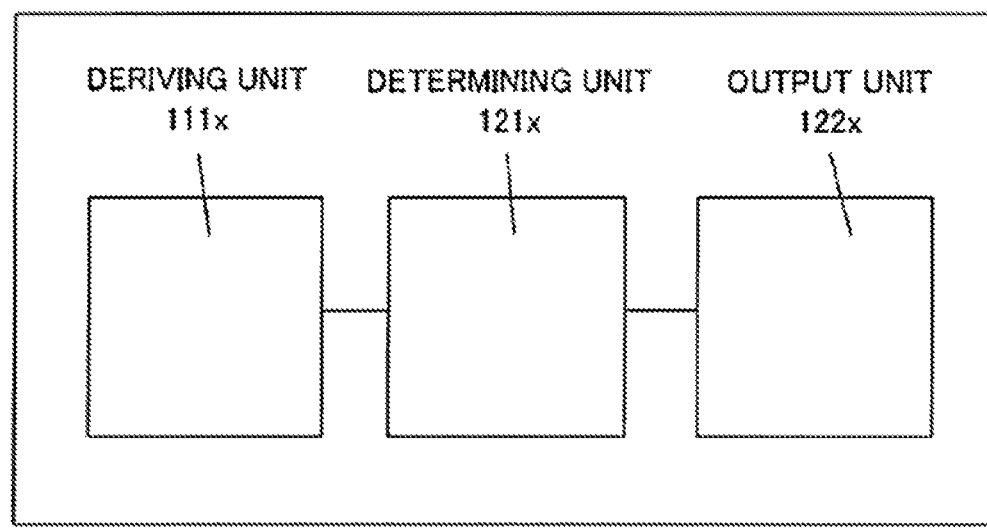
FIG. 11 is a conceptual diagram illustrating a minimum configuration of a determining device of the present invention.

Note that FIG. 11 is a conceptual diagram illustrating a configuration of a determining device 136x as a minimum determining device of the present invention.

The determining device 136x includes a deriving unit 111x, a determining unit 121x, and an output unit 122x.

From a predetermined output value, the deriving unit 111x derives a degree value representing a degree of a time change of the output value.

The determining unit 121x derives a third determination result, which is regarding a first output value as the above-described output value, from a first determination result and a second determination result. Herein, the first determination result is a determination result regarding a magnitude of the above-described first output value relating to a first time associated with a time when the above-described first output value is output. Moreover, the second determination result is a determination result regarding a magnitude of a first degree value as the above-described degree value which the deriving unit derives from the plurality of output values relating to respective plural pieces of time including the above-described first time.

The output unit 122x outputs the above-described third determination result.

The above-described first determination result is likely to be affected by a noise for the above-described output value. Therefore, when an abnormality represented by the above-described output value is determined from only the above-described first determination result, a determination result by the determination has a large error.

In contrast, even in the case of determining a content that represents a possibility of an abnormality of the above-described output value on the basis of the first determination result, the determining device 136x is capable of correcting the first determination result by the second determination result. Herein, the second determination result is a determination result relating to a degree value derived from the above-described output value including the above-described output value relating to the first time. The above-described degree value is a value representing a degree of a time change of the output value. Hence, the determining device 136x corrects the above-described first determination result by the above-described degree value, thus making it possible to improve the determination accuracy for the abnormality represented by the above-described output value.

Therefore, the determining device 136x exerts the effect described in the section of [Advantageous Effects of Invention] by the above-described configuration.

As above, the respective embodiments of the present invention have been described. However, the present invention is not limited to the above-described embodiments, and can be further modified, replaced and adjusted within the scope without departing from the basic technical idea of the present invention. For example, the configuration of the elements illustrated in the respective drawings is an example for assisting the understanding of the present invention, and is not limited to the configuration illustrated in these drawings.

The whole or part of the example embodiments disclosed above can be described as, but not limited to, the following supplementary notes.

(Supplementary Note 1)

A determining device including:

a deriving unit that derives, from a predetermined output value, a degree value representing a degree of a time change of the output value;

a determining unit that derives a third determination result regarding a first output value being the output value from a first determination result regarding a magnitude of the first output value relating to a first time associated with a time when the first output value is output, and a second determination result regarding a magnitude of a first degree value being the degree value which the deriving unit derives from the output value relating to each of a plurality of times including the first time; and an output unit that outputs the third determination result.

(Supplementary Note 2)

The determining device according to supplementary note 1, wherein the first determination result is a determination result for a magnitude of the first output value with respect to a first threshold value.

(Supplementary Note 3)

The determining device according to supplementary note 2, wherein the second determination result is a determination result for a magnitude of the first degree value with respect to a second threshold value.

(Supplementary Note 4)

The determining device according to supplementary note 3, wherein the second threshold value is zero.

(Supplementary Note 5)

The determining device according to supplementary note 3 or 4, wherein the determining device derives the third determination result from a fourth determination result regarding a second output value being the output value relating to a second time after an elapse of a predetermined time from the time, and a fifth determination result regarding a second degree value being the degree value which the deriving unit derives from the output value including the second output value relating to the second time, in addition to the first determination result and the second determination result.

(Supplementary Note 6)

The determining device according to supplementary note 5, wherein the fourth determination result is a determination result for a magnitude of the second output value with respect to a third threshold value.

(Supplementary Note 7)

The determining device according to supplementary note 5 or 6, wherein the fifth determination result is a determination result for a magnitude of the second degree value with respect to a fourth threshold value.

(Supplementary Note 8)

The determining device according to supplementary note 6, wherein the first threshold value and the third threshold value are equal to each other.

(Supplementary Note 9)

The determining device according to supplementary note 7, wherein the second threshold value and the fourth threshold value are equal to each other.

(Supplementary Note 10)

The determining device according to supplementary note 7 or 9, wherein the fourth threshold value is zero.

(Supplementary Note 11)

The determining device according to any one of supplementary notes 1 to 10, wherein the degree value is an inclination of a curve representing the time change.

(Supplementary Note 12)

The determining device according to any one of supplementary notes 1 to 11, wherein the degree value is a change amount of the output value per predetermined time.

(Supplementary Note 13)

The determining device according to any one of supplementary notes 1 to 12, wherein the third determination result is about presence or absence of an abnormality for the output.

(Supplementary Note 14)

The determining device according to any one of supplementary notes 5 to 10, wherein the fifth determination result is derived from a sixth determination result derived from the first determination result and the second determination result, and a seventh determination result derived from the third determination result and the fourth determination result.

(Supplementary Note 15)

The determining device according to supplementary note 14, wherein both of the sixth determination result and the seventh determination result suggest presence or absence of a possibility of an abnormality of the output.

(Supplementary Note 16)

The determining device according to supplementary note 14 or 15, wherein, when both of the sixth determination result and the seventh determination result suggest a possibility of an abnormality of the output, the fifth determination result represents an abnormality of the output.

(Supplementary Note 17)

The determining device according to any one of supplementary notes 5 to 10, further including a processing device that performs predetermined processing, based on the fifth determination result.

(Supplementary Note 18)

A determining method including:

deriving, from a predetermined output value, a degree value representing a degree of a time change of the output value;

deriving a third determination result regarding a first output value being the output value from a first determination result regarding a magnitude of the first output value relating to a first time associated with a time when the first output value is output, and a second determination result regarding a magnitude of a first degree value being the degree value derived from the output value relating to each of a plurality of times including the first time; and outputting the third determination result.

(Supplementary Note 19)

A determining program causing a computer to execute:

processing of deriving, from a predetermined output value, a degree value representing a degree of a time change of the output value;

processing of deriving a third determination result regarding a first output value being the output value from a first determination result regarding a magnitude of the first output value relating to a first time associated with a time when the first output value is output, and a second determination result regarding a magnitude of a first degree value being the degree value derived from the output value relating to each of a plurality of times including the first time; and processing of outputting the third determination result.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2016-240897 filed on Dec. 13, 2016, the disclosure of which is incorporated herein in its entirety by reference.

REFERENCE SIGNS LIST

101 Sensor
106 Output monitoring unit
111 Output change deriving unit
111x Deriving unit
116 Output change monitoring unit
121, 121x Determining unit
122x Output unit
126 Recording unit
131 Processing device
136, 136x Determining device
141 Determining system
A, B, C Time
Th1 Threshold value
ΔT3 Time

What is claimed is:

1. A determining device comprising:

a deriving circuit that derives, from an output value output from a sensor, a degree value representing a degree of a time change of the output value;

a determining circuit that:

determines a first determination result regarding a magnitude of a first output value relating to a first time when the first output value is output by the sensor, determines a second determination result regarding a magnitude of a first degree value being the degree value which the deriving circuit derives from the output value relating to each of a plurality of times including the first time, and determines a third determination result regarding a first output value being the output value based on the first determination result and the second determination result; and an output circuit that outputs the third determination result, which indicates a presence or an absence of an abnormality in the output from the sensor, wherein an influence, caused by an increase of noise or a decrease of noise within a short duration of time, on the output value from the sensor is reduced based on the second determination result, wherein the first determination result is a determination result for a magnitude of the first output value with respect to a first threshold value, wherein the second determination result is a determination result for a magnitude of the first degree value with respect to a second threshold value, and wherein the determining device derives the third determination result from a fourth determination result regarding a second output value being the output value relating to a second time after an elapse of a predetermined time from the time, and a fifth determination result regarding a second degree value being the degree value which the deriving circuit derives from the output value including the second output value relating to the second time, in addition to the first determination result and the second determination result.

2. The determining device according to claim 1, wherein the second threshold value is zero.

3. The determining device according to claim 1, wherein the fourth determination result is a determination result for a magnitude of the second output value with respect to a third threshold value.

4. The determining device according to claim 1, wherein the fifth determination result is a determination result for a magnitude of the second degree value with respect to a fourth threshold value.

5. The determining device according to claim 3, wherein the first threshold value and the third threshold value are equal to each other.

6. The determining device according to claim 4, wherein the second threshold value and the fourth threshold value are equal to each other.

7. The determining device according to claim 4, wherein the fourth threshold value is zero.

8. The determining device according to claim 1, wherein the degree value is an inclination of a curve representing the time change.

9. The determining device according to claim 1, wherein the degree value is a change amount of the output value per predetermined time.

10. The determining device according to claim 1, wherein the third determination result is derived from a sixth determination result derived from the first determination result and the second determination result, and a seventh determination result derived from the fourth determination result and the fifth determination result.

11. The determining device according to claim 10, wherein both of the sixth determination result and the seventh determination result suggest the presence or the absence of a possibility of the abnormality of the output.

12. The determining device according to claim 10, wherein, when both of the sixth determination result and the seventh determination result suggest a possibility of the abnormality of the output, the fifth determination result represents the abnormality of the output.

13. The determining device according to claim 1, further including a processing device that performs predetermined processing, based on the fifth determination result.

14. A determining method including:
deriving, from an output value output from a sensor, a degree value representing a degree of a time change of the output value;
determining a first determination result regarding a magnitude of a first output value relating to a first time when the first output value is output by the sensor;
determining a second determination result regarding a magnitude of a first degree value being the degree value which the deriving circuit derives from the output value relating to each of a plurality of times including the first time;
determining a third determination result regarding a first output value being the output value based on the first determination result and the second determination result; and
outputting the third determination result, which indicates a presence or an absence of an abnormality in the output from the sensor, wherein an influence, caused by an increase of noise or a decrease of noise within a short duration of time, on the output value from the sensor is reduced based on the second determination result,
wherein the first determination result is a determination result for a magnitude of the first output value with respect to a first threshold value,
wherein the second determination result is a determination result for a magnitude of the first degree value with respect to a second threshold value, and
wherein the determining method further comprises deriving the third determination result from a fourth determination result regarding a second output value being the output value relating to a second time after an elapse of a predetermined time from the time, and a fifth determination result regarding a second degree value being the degree value which is derived from the output value including the second output value relating to the second time, in addition to the first determination result and the second determination result.

15. A recorded medium recorded with a determining program causing a computer to execute:
processing of deriving, from an output value output from a sensor, a degree value representing a degree of a time change of the output value;
processing of determining a first determination result regarding a magnitude of a first output value relating to a first time when the first output value is output by the sensor;
processing of determining a second determination result regarding a magnitude of a first degree value being the degree value which the deriving circuit derives from the output value relating to each of a plurality of times including the first time;
processing of determining a third determination result regarding a first output value being the output value based on the first determination result and the second determination result; and
processing of outputting the third determination result, which indicates a presence or an absence of an abnormality in the output from the sensor, wherein an influence, caused by an increase of noise or a decrease of noise within a short duration of time, on the output value from the sensor is reduced based on the second determination result,
wherein the first determination result is a determination result for a magnitude of the first output value with respect to a first threshold value,
wherein the second determination result is a determination result for a magnitude of the first degree value with respect to a second threshold value, and
wherein the processing of determining the third determination result comprises deriving the third determination result from a fourth determination result regarding a second output value being the output value relating to a second time after an elapse of a predetermined time from the time, and a fifth determination result regarding a second degree value being the degree value which is derived from the output value including the second output value relating to the second time, in addition to the first determination result and the second determination result.

* * * * *